(12) United States Patent
Sun et al.

(10) Patent No.: US 11,802,561 B1
(45) Date of Patent: Oct. 31, 2023

(54) CANTILEVER VERTICAL SCREW VACUUM PUMP

(71) Applicant: Hangzhou Qiandao Pump Co., Ltd., Hangzhou (CN)

(72) Inventors: Chengzhong Sun, Zibo (CN); Bo Zhang, Jiande (CN)

(73) Assignee: HANGZHOU QIANDAO PUMP CO., LTD., Hangzhou (CN)

( * ) Notice: Subject to any disclaimer, the term of this patent is extended or adjusted under 35 U.S.C. 154(b) by 0 days.

(21) Appl. No.: 17/965,810

(22) Filed: Oct. 14, 2022

(30) Foreign Application Priority Data

Jul. 6, 2022 (CN) .......................... 202210795872.6

(51) Int. Cl.
| | | |
|---|---|---|
| *F04C 18/16* | (2006.01) | |
| *F04C 29/02* | (2006.01) | |
| *F04C 29/00* | (2006.01) | |
| *F04C 29/04* | (2006.01) | |
| *F04C 27/00* | (2006.01) | |

(52) U.S. Cl.
CPC ............ *F04C 18/16* (2013.01); *F04C 27/009* (2013.01); *F04C 29/005* (2013.01); *F04C 29/02* (2013.01); *F04C 29/028* (2013.01); *F04C 29/04* (2013.01); *F04C 2220/10* (2013.01); *F04C 2240/51* (2013.01); *F04C 2240/605* (2013.01)

(58) Field of Classification Search
CPC ...... F04C 18/16; F04C 27/009; F04C 29/005; F04C 29/02; F04C 29/028; F04C 29/04; F04C 2220/10; F04C 2240/51; F04C 2240/605
See application file for complete search history.

(56) References Cited

FOREIGN PATENT DOCUMENTS

| | | | | |
|---|---|---|---|---|
| CN | 203655618 | U | * | 6/2014 |
| CN | 206647264 | U | * | 11/2017 |
| CN | 216554421 | U | * | 5/2022 |
| CN | 114593055 | A | * | 6/2022 |

OTHER PUBLICATIONS

English Abstract and Claims for CN203655618U, translated via USPTO Fit Database (Year: 2014).*
English Translation for CN206647264U, translated via USPTO Fit Database (Year: 2017).*
English Translation for CN114593055A, translated via USPTO Fit Database (Year: 2022) (Year: 2017).*
English Translation for CN216554421, translated via USPTO Fit Database (Year: 2022).*

* cited by examiner

*Primary Examiner* — Dominick L Plakkoottam
*Assistant Examiner* — Paul W Thiede
(74) *Attorney, Agent, or Firm* — Zhigang Ma

(57) ABSTRACT

A cantilever vertical screw vacuum pump is provided. The vacuum pump has a lubrication system, in the system, an oil splashing sleeve splashes lubricating oil in an oil chamber, the lubricating oil is splashed to the oil guide plates and enters two inner shaft sleeves through oil inlet holes, the lubricating oil is splashed by rotations of lower bearings to lubricate upper bearings and bearing gland oil seal assemblies. A fit between an oil baffle and a lower cover shaft sleeve is a clearance fit, and the oil baffle prevents the lubricating oil from entering a vertical motor. A pressure difference between screw rods is used to output reflux air from a near exhaust end of the screw rods, the reflux air is cooled in a coolant by a reflux cooling pipe, and the cooled reflux air is delivered to the screw rods to reduce an air temperature of the pump chamber.

6 Claims, 3 Drawing Sheets

CANTILEVER VERTICAL SCREW VACUUM PUMP

TECHNICAL FIELD

The disclosure relates to a technical field of screw vacuum pumps, in particular to a cantilever vertical screw vacuum pump.

BACKGROUND

A screw vacuum pump provides excellent performance. The screw vacuum pump exhibits high vacuum, is a simple system structure to construct, and operates without any working medium during vacuum pumping. It belongs to a class of pumps that is considered to be dry vacuum equipment and provides the advantages of being easy to clean, is environmentally friendly to operate, and offers high efficiency. The screw vacuum pump provides improvements over a traditional water ring vacuum pump or a reciprocating vacuum pump. Compared with a horizontal screw pump, a vertical screw pump occupies a smaller area and has fewer leakage faults. The screw rod of a vertical screw pump is easier to clean. For these reasons, the screw vacuum pump/ vertical screw pump is becoming increasingly favored for use in pump applications in the commercial pump market.

At present, there are four types of the vertical screw pumps. The first type uses an intermediate gear (i.e., a motor is connected to a driving pump shaft by gear meshing) to drive a screw rod to rotate and create a vacuum; the disadvantages of the first type are that the operation noise is large, the manufacturing cost of the intermediate gear is required, and the assembly is more complicated. The second type drives a driving screw rod and a driven screw rod to rotate by a belt and a pulley, and the second type provides disadvantages of high requirements on the belt, short service life, frequent requirements to adjust the belt tightness, and being unsuitable for using in an explosive environment. The third type provides two special motors to directly drive a screw rod, and the two special motors operate synchronously; the third type provides disadvantages that it needs to use special synchronous motors and add a numerical control system, which is expensive and difficult to solve. The fourth type is an existing horizontal screw vacuum pump installed vertically, the fourth type only provides an advantage of reducing the installation area, but some disadvantages of the horizontal screw vacuum pump, such as more sealing points and leakages, have not been solved. In order to cool a working temperature of a pump chamber or lubricate a bearing, some vertical screw vacuum pumps provide an additional pressure pump to deliver the coolant or lubricating oil, which will also increase the manufacturing cost and complicate the process, and the pressure pump also brings new fault points.

SUMMARY

In order to solve the disadvantages in the prior art. The disclosure provides a cantilever vertical screw vacuum pump, screw rods are installed as cantilever structures of the pump, an inner shaft sleeve and a lubricating oil lifter are disposed in each of the screw rods, a motor shaft extends directly into a lower cover shaft sleeve which protrudes upward, an oil baffle is disposed outside the motor shaft to prevent lubricating oil from entering a motor, which simplifies a power transmission process of the cantilever vertical screw vacuum pump and completely solves a problem of leakage at an air inlet of the cantilever vertical screw vacuum pump. Through the lubricating oil lifters, an upper bearing and a lower bearing installed in each inner shaft sleeve are fully lubricated. A reflux cooling pipe is provided in the cantilever vertical screw vacuum pump, a pressure difference between the screw rods in a pump chamber make the reflux cooling pipe to output reflux air from a near exhaust end of the screw rods, the reflux air is cooled through a coolant in an interlayer of a pump body, then cooled reflux air is delivered into the screw rods, and thus the reflux cooling pipe reduces a temperature of the pump chamber. For these reasons, the cantilever vertical screw vacuum pump has a long service life and is convenient for disassembling and cleaning.

The cantilever vertical screw vacuum pump disclosed by the disclosure includes a pump body. The pump body is provided with pump shafts including a driving pump shaft and a driven pump shaft. A driving screw rod and a driven screw rod are disposed in the pump body and meshed together. The driving screw rod and the driven screw rod are installed as cantilever structures on the driving pump shaft and the driven pump shaft respectively. A middle support is disposed under the pump body and installed on a base. A bottom of the middle support is provided with a lower cover assembled with the middle support. The lower cover is provided with a lower cover shaft sleeve protruding upward. A vertical motor is disposed under the lower cover disposed in a cavity of the base. An output shaft of the vertical motor is disposed in the lower cover shaft sleeve, and an oil chamber is defined between an inner wall of the lower cover and an outer wall of the lower cover shaft sleeve. The driving pump shaft and the driven pump shaft are respectively fixedly installed in two inner shaft sleeves by bearings and lubricating oil lifters disposed in the two inner shaft sleeves. The two inner shaft sleeves are disposed at lower parts of the driving pump shaft and the driven pump shaft respectively. A length of the two inner shaft sleeves is shorter than a length of corresponding one of the pump shafts. Upper parts of the pump shafts are located outside the two inner shaft sleeves respectively (That means, the bearings including upper bearings and lower bearings are used as fulcrums at middle and lower parts of the pump shafts). Upper parts of the pump shafts are suspended without fulcrums, which forms cantilever structures; air inlets cannot be supported by the bearings due to the cantilever structures, so that there is no need for lubrication and sealing in the cantilever vertical screw vacuum pump, and this reduces a fault point; and the cantilever structures greatly reduce heights of the upper bearings, which are conducive to lubricating oil reaching the upper bearings. Lower ends of the two inner shaft sleeves are fixed on the middle support. Disc structures of lower parts of the two inner shaft sleeves provide a positioning function for the installation of the pump body. Bearing gland oil seal assemblies are disposed on upper ends of the two inner shaft sleeves respectively. The lower ends of the two inner shaft sleeves extend into the middle support. Portions of the two inner shaft sleeves extending into the middle support are provided with oil inlet holes. An oil guide plate is disposed under the oil inlet holes of each of the two inner shaft sleeves. A driving synchronous gear and a driven synchronous gear are disposed at lower ends of the pump shafts respectively. An oil splashing sleeve is disposed under the driven synchronous gear. An oil baffle is disposed under the driving pump shaft, and the oil baffle is sleeved on the lower cover shaft sleeve.

During rotations of the pump shafts, the oil splashing sleeve splashes the lubricating oil in the oil chamber, then parts of the lubricating oil are splashed on the driving and driven synchronous gears for lubricating the driving and driven synchronous gears. Other parts of the lubricating oil are splashed to the oil guide plates, the other parts of the lubricating oil enter the two inner shaft sleeves through the oil inlet holes under guidance of the oil guide plates, a part of the lubricating oil is used to lubricate the lower bearings and another part of the lubricating oil is splashed on the lubricating oil lifters by rotations of the bearings. Under high-speed rotations of the lubricating oil lifters, the lubricating oil stored in the spiral grooves of the lubricating oil lifters is lifted up to lubricate the upper bearings and the bearing gland oil seal assemblies. The lubricating oil returns to the oil chamber under the action of gravity and also plays a cooling role. The oil baffle is sleeved on the lower cover shaft sleeve to prevent the lubricating oil from entering the vertical motor.

The vertical motor disposed under the lower cover delivers power to a pump coupling, the driving synchronous gear, and the driving screw rod by a motor coupling. The driving screw rod drives the driven screw rod to rotate by a meshing action between the driving synchronous gear and the driven synchronous gear.

A coolant spacer sleeve is disposed on the pump body. A reflux cooling pipe is disposed in the coolant spacer sleeve. Two ends of the reflux cooling pipe are connected to a reflux input pipe joint and a reflux output pipe joint respectively, and a position of the reflux input pipe joint and a position of the reflux output pipe joint are at different heights. A pressure difference between the screw rods is used to deliver air cooled in the coolant spacer sleeve to the pump chamber, which reduces a temperature of the pump chamber.

In an embodiment, an outer diameter of the oil baffle is provided with evenly distributed oil splashing holes, which can use a centrifugal force to remove the lubricating oil splashed between the oil baffle and the lower cover shaft sleeve, and better prevent the lubricating oil from entering the vertical motor. A fit between an inner diameter of the oil baffle and an outer diameter of the lower cover shaft sleeve is a clearance fit.

Each of the two inner shaft sleeves of the disclosure is provided with one or more labyrinth sealing grooves. Since there is a gap between an outer diameter of the each of the two inner shaft sleeves and an inner diameter of each of the screw rods, there will be a relatively high negative pressure in the pump chamber when the screw rods rotate, and thus there will be the same negative pressure in the gap. However, there is a positive pressure in the each of the two inner shaft sleeves, so that a large pressure difference will exist inside and outside of each of the bearing gland oil seal assemblies. Each of the labyrinth sealing grooves is a barrier of a leak passage, which reduces the pressure difference between the inside and outside of each of the bearing gland oil seal assemblies, thereby ensuring the lubricating oil can be sealed in the two inner shaft sleeves.

Compared with the prior art, the disclosure has beneficial effects described below.

1) The pump shafts, the bearings, and the lubricating oil lifter are disposed in the two inner shaft sleeves of the disclosure, and the two inner shaft sleeves have a positioning function for an installation of the pump body.

2) The disclosure has a lubrication system. In the system, the oil splashing sleeve splashes the lubricating oil in the oil chamber to a whole space. Parts of the lubricating oil are splashed to the oil guide plates, then entering the two inner shaft sleeves through the oil inlet holes disposed at a lower part of each of the two inner shaft sleeves. The lubricating oil splashed by rotations of the lower bearings is lifted up to upper parts of the two inner shaft sleeves by a left-hand lubricating oil lifter and a right-hand lubricating oil lifter, then the lubricating oil lubricates the upper bearings and the bearing gland oil seal assemblies. The lubricating oil returns to the oil chamber under the action of gravity and also plays a cooling role.

3) A fit between an inner diameter of the oil baffle and an outer diameter of the lower cover shaft sleeve is a clearance fit, and the oil baffle is provided with evenly distributed oil splashing holes to prevent the lubricating oil from entering the vertical motor.

4) Installing a reflux cooling pipe in the cantilever vertical screw vacuum pump, which uses a pressure difference between the screw rods in a pump chamber to output reflux air from a near exhaust end of the screw rods, cooling the reflux air in a coolant in an interlayer of a pump body by the reflux cooling pipe, then delivering cooled reflux air to the screw rods, the reflux cooling pipe reduces an air temperature of the pump chamber.

5) The disclosure simplifies the power transmission process and lubricates the bearings fully, and the temperature the pump chamber is lower. The disclosure has a long service life and is convenient for disassembly overhaul and cleaning.

DESCRIPTION OF REFERENCE NUMERALS

1—upper cover, 2—pump body, 3—driven pump shaft, 4—driving pump shaft, 5—left-hand lubricating oil lifter, 6—right-hand lubricating oil lifter, 7—reflux cooling pipe, 8—driving screw, 9—driven screw, 10—middle support, 11—driving synchronous gear, 12—driven synchronous gear, 13—motor coupling, 14—oil splashing sleeve, 15—lower cover, 16—base, 17—vertical motor, 18—bearing gland oil seal assembly, 19—bearing, 20—inner shaft sleeve, 21—oil guide plate, 22—pump coupling, 23—oil baffle, 24—reflux input pipe joint, 25—reflux output pipe joint, 26—lower cover shaft sleeve, 27—oil chamber, 28—oil inlet hole, 29—labyrinth sealing groove, 30—spiral groove, 31—oil splashing hole, 32—coolant spacer sleeve; 33—disc structure.

DETAILED DESCRIPTION OF EMBODIMENTS

The disclosure will be further described with reference to specific embodiments. However, in the description of the disclosure, it should be noted that an orientation or positional relationship indicated by the terms "front end", "rear end", "left and right", "up", "down", "horizontal" and others are based on the orientation or positional relationship shown in the attached drawings. It is only for the convenience of describing the disclosure and simplifying the description, and does not indicate or imply that the device or element referred must have a specific orientation, or the embodiments must be constructed and operated in a specific orientation. Therefore, the terms cannot be construed as a limitation of the disclosure.

In the description of the disclosure, it should also be noted that the terms such as "dispose", "install", "connect", "attach", and "link" shall be generally understood, for example they can be understood as fixed connection, or detachable connection, or integrated connection, and can be direct connection, or indirect connection through an intermediate medium, or the communication between two components. For those skilled in the art, the specific meaning of the above terms in the disclosure may be understood according to specific circumstances.

Figure 1:
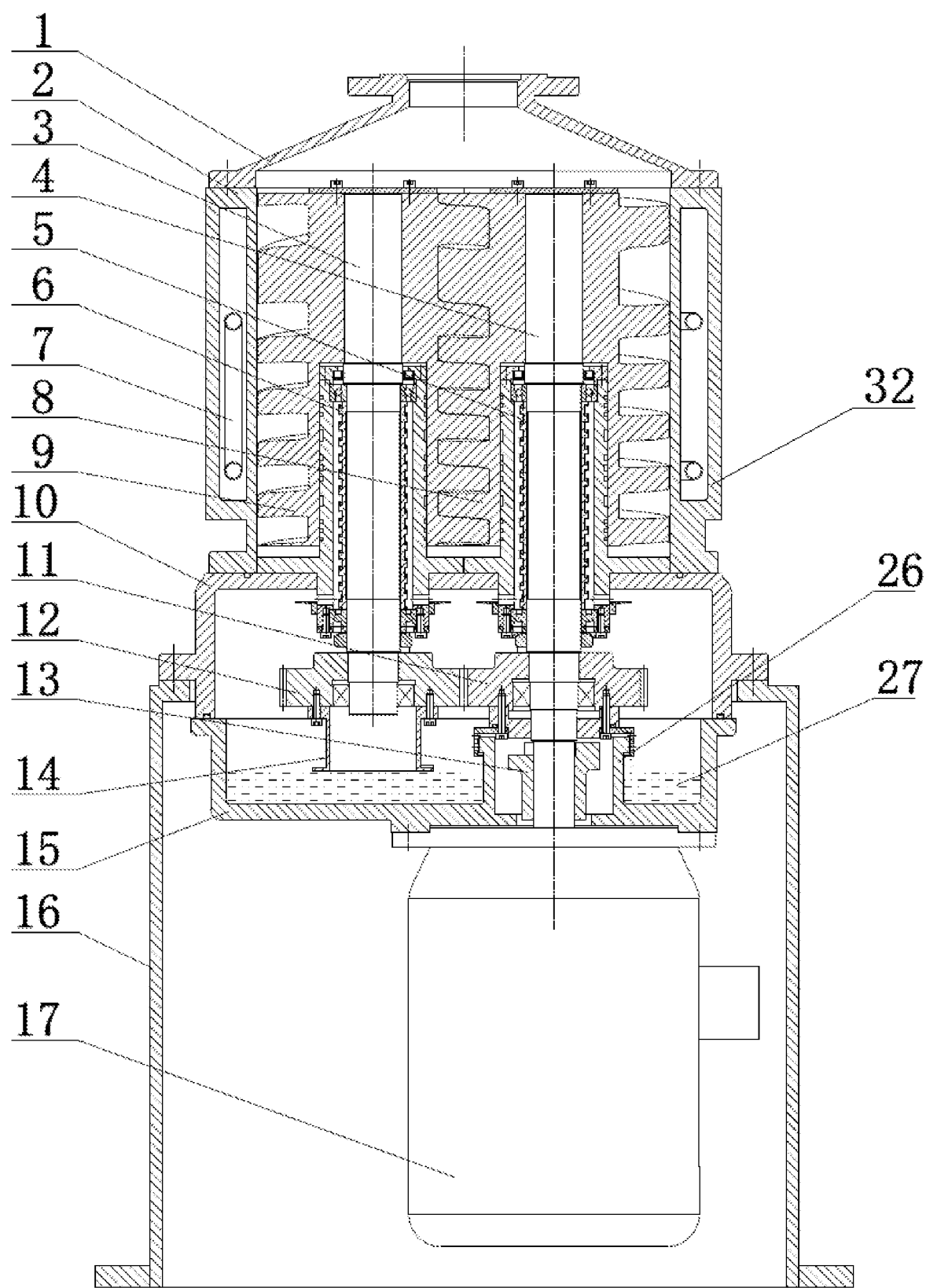
FIG. 1 is a schematic diagram of the overall structure of the disclosure.
Figure 2:
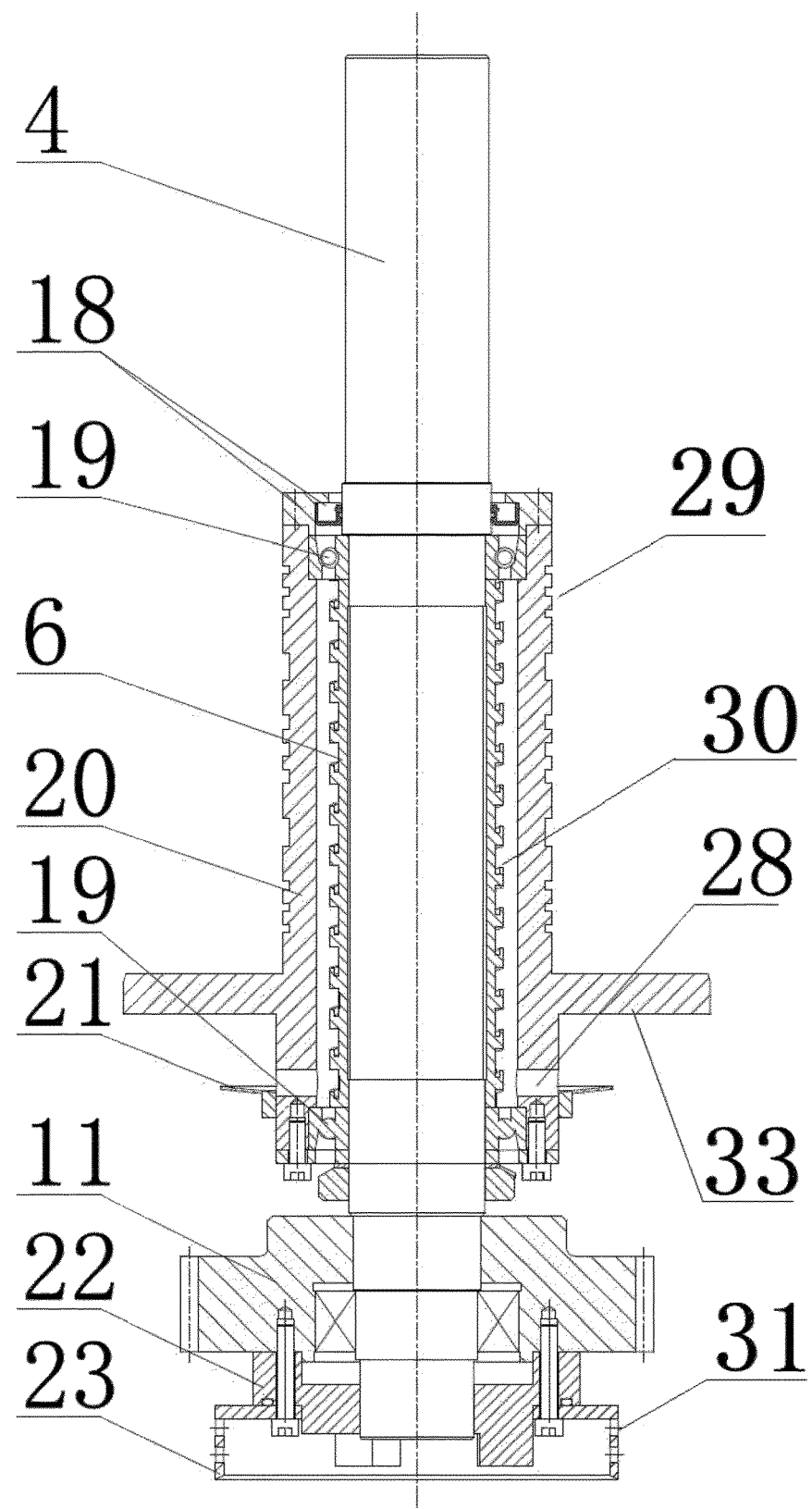
FIG. 2 is an assembly relationship of an inner shaft sleeve and main components.
Figure 3:
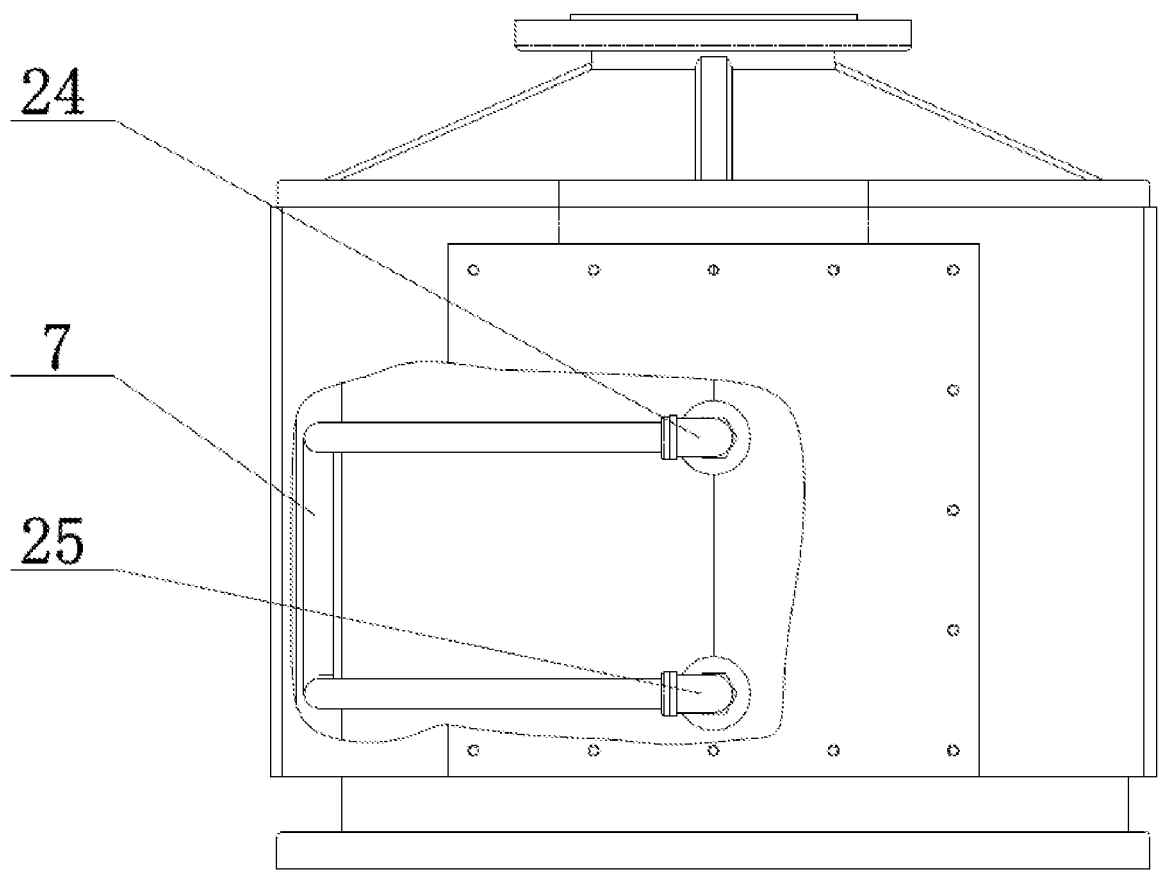
FIG. 3 is a schematic diagram of installation positions of a reflux input pipe joint, a reflux output pipe joint, and a reflux cooling pipe.

As shown in FIG. 1 to FIG. 3, a cantilever vertical screw vacuum pump described in the embodiment includes a housing assembly, the housing assembly includes an upper cover 1, a pump body 2, a middle support 10, a lower cover 15, and a base 16 from top to bottom. The middle support 10 and the pump body 2 are installed on the base 16, and a bottom of the middle support 10 is provided with a lower cover 15 assembled with the middle support 10. The lower cover 15 is provided with a lower cover shaft sleeve 26 protruding upward. A vertical motor 17 is disposed under the lower cover 15 in a cavity of the base 16. An output shaft of the vertical motor 17 is disposed in the lower cover shaft sleeve 26, and an oil chamber 27 is defined between an inner wall of the lower cover 15 and an outer wall of the lower cover shaft sleeve 26. The driving pump shaft 4 and the driven pump shaft 3 are respectively installed fixedly in two inner shaft sleeves 20 by upper and lower bearings 19 and a left-hand lubricating oil lifter 5 and a right-hand lubricating oil lifter 6 disposed in the two inner shaft sleeves 20. The two inner shaft sleeves 20 are disposed at lower parts of the driving pump shaft 4 and the driven pump shaft 3 respectively. A length of each of the two inner shaft sleeves 20 is shorter than a length of respective corresponding pump shafts. Upper parts of the pump shafts are outside the two inner shaft sleeves 20. The left-hand lubricating oil lifter 5, the right-hand lubricating oil lifter 6, and the pump shafts rotate synchronously. One or more spiral grooves 30 are provided on the left-hand lubricating oil lifter 5 and the right-hand lubricating oil lifter 6. Bearing gland oil seal assemblies 18 are disposed on upper ends of the two inner shaft sleeves 20 respectively. Screw rods include a driving screw rod 8 and a driven screw rod 9 disposed on upper parts of the driving pump shaft 4 and the driven pump shaft 3 respectively. Segmented labyrinth sealing grooves 29 are arranged at upper, lower, and middle parts of the outer diameters of each of the two inner shaft sleeves 20. Since there is a gap between the outer diameter of the each of the two inner shaft sleeves 20 and an inner diameter of each of the screw rods, there will be a relatively high negative pressure in the pump chamber when the screw rods rotate, and thus there will be the same negative pressure in the gap. However, there is a positive pressure in the each of the two inner shaft sleeves 20, and a large pressure difference will exist inside and outside of each of the bearing gland oil seal assemblies 18. Each of the labyrinth sealing grooves 29 is a barrier of a leak passage, which reduces the pressure difference between the inside and outside of each of the bearing gland oil seal assemblies 18, thereby ensuring the lubricating oil can be sealed in the two inner shaft sleeves 20.

A lower part of each of the two inner shaft sleeves 20 is provided with a disc structure 33. The pump body 2 is positioned on the middle support 10 by the disc structures 33. Portions of the two inner shaft sleeves 20 extending into the middle support 10 are provided with oil inlet holes 28.

An oil guide plate 21 is disposed under the oil inlet holes 28 of each of the two inner shaft sleeves 20. A driving synchronous gear 11 and a driven synchronous gear 12 are disposed at lower ends of the driving pump shaft 4 and the driven pump shaft 3 respectively. An oil splashing sleeve 14 is disposed under the driven synchronous gear 12, an oil baffle 23 is disposed below the driving synchronous gear 11 through a pump coupling 22. An outer diameter of the oil baffle 23 is provided with evenly distributed oil splashing holes 31. The oil baffle 23 is sleeved on the lower cover shaft sleeve 26, and a fit between an inner diameter of the oil baffle 23 and an outer diameter of the lower cover shaft sleeve 26 is a clearance fit.

The vertical motor 17 disposed under the lower cover 15 delivers power to a pump coupling 22 and the driving synchronous gear 11 through a motor coupling 13. The vertical motor 17 drives the two screw rods to rotate through a meshing action between the driving synchronous gear 11 and the driven synchronous gear 12. A coolant spacer sleeve 32 is disposed on the pump body 2. A reflux input pipe joint 24 and a reflux output pipe joint 25 are disposed in the coolant spacer sleeve 32, and a position of the reflux input pipe joint 24 and a position of the reflux output pipe joint 25 are at different heights. A reflux cooling pipe 7 is connected between the reflux input pipe joint 24 and the reflux output pipe joint 25. A pressure difference between the screw rods is used to deliver air cooled in the coolant spacer sleeve 32 to the pump chamber, which reduces a temperature of the pump chamber.

In order to understand the disclosure clearer, an operating principle of the embodiment is described below.

During rotations of the pump shafts, the oil splashing sleeve 14 splashes the lubricating oil in the oil chamber 27, then parts of the lubricating oil are splashed on the driving synchronous gear 11 and the driven synchronous gear 12 for lubricating the driving synchronous gear 11 and the driven synchronous gear 12. Other parts of the lubricating oil are splashed to the oil guide plates 21, and the other parts of the lubricating oil enter the two inner shaft sleeves 20 through the oil inlet holes 28 under a guidance of the oil guide plates 21. A part of the lubricating oil is used to lubricate the lower bearings 19 and another part of the lubricating oil is splashed on the lubricating oil lifters by rotations of the bearings 19. Under high-speed rotations of the lubricating oil lifters, the lubricating oil stored in the spiral grooves 30 of the lubricating oil lifters is lifted up to lubricate the upper bearings 19 and the bearing gland oil seal assemblies 18. The lubricating oil returns to the oil chamber under the action of gravity and also plays a cooling role. The oil baffle 23 is sleeved on the lower cover shaft sleeve 26 to prevent the lubricating oil from entering the vertical motor 17. A centrifugal force provided by the screw rods is used to remove the lubricating oil between the oil baffle 23 and the lower cover shaft sleeve 26, which further prevents the lubricating oil from entering the vertical motor 17.

The above descriptions are only some embodiments of the disclosure and cannot be considered as a limiting scope of embodiments of the disclosure. The disclosure is not limited to the above embodiments, and similar changes and improvements made by those skilled in the art within a substantive scope of the disclosure should belong to a patent coverage of the disclosure.

What is claimed is:

1. A cantilever vertical screw vacuum pump, comprising: a pump body, a driving screw rod, a driven screw rod, pump shafts comprising a driving pump shaft and a driven pump shaft, a middle support, a base, a lower cover, a vertical motor, a lower cover shaft sleeve, bearings, two inner shaft sleeves, lubricating oil lifters, bearing gland oil seal assemblies, oil guide plates, a driving synchronous gear, a driven synchronous gear, an oil splashing sleeve, and an oil baffle;

wherein the driving screw rod and the driven screw rod are disposed in the pump body and meshed together, the driving screw rod and the driven screw rod as cantilever structures are installed on the driving pump shaft and the driven pump shaft respectively, the middle support is disposed under the pump body and installed on the base; a bottom of the middle support is provided with the lower cover assembled with the middle support, the lower cover is provided with the lower cover shaft sleeve protruding upward, the vertical motor is disposed under the lower cover in a cavity of the base, an output shaft of the vertical motor is disposed in the lower cover shaft sleeve, and an oil chamber is defined between an inner wall of the lower cover and an outer wall of the lower cover shaft sleeve;

wherein the driving pump shaft and the driven pump shaft are respectively fixedly installed in the two inner shaft sleeves by the bearings and the lubricating oil lifters disposed in the two inner shaft sleeves, the two inner shaft sleeves are disposed at lower parts of the pump shafts respectively, a length of each of the two inner shaft sleeves is shorter than a length of the respective corresponding pump shafts, upper parts of the pump shafts are located outside the two inner shaft sleeves respectively, lower ends of the two inner shaft sleeves are fixed on the middle support, disc structures disposed at lower parts of the two inner shaft sleeves are engaged to sections of the pump body at a bottom of the pump body, the bearing gland oil seal assemblies are disposed on upper ends of the two inner shaft sleeves respectively, the lower ends of the two inner shaft sleeves extend into the middle support, portions of the two inner shaft sleeves extending into the middle support are provided with oil inlet holes, and each of the oil guide plates is disposed adjacent to the oil inlet holes of each of the two inner shaft sleeves; and wherein the driving synchronous gear and the driven synchronous gear are disposed at lower ends of the pump shafts respectively, the oil splashing sleeve is disposed under the driven synchronous gear, the oil baffle is disposed under the driving pump shaft, and the oil baffle is sleeved on the lower cover shaft sleeve.

2. The cantilever vertical screw vacuum pump according to claim 1, wherein the lubricating oil lifters comprise a left-hand lubricating oil lifter and a right-hand lubricating oil lifter, the left-hand lubricating oil lifter and the right-hand lubricating oil lifter are disposed in the two inner shaft sleeves respectively, the lubricating oil lifters rotate synchronously with the pump shafts respectively, and each of the lubricating oil lifters is provided with one or more spiral grooves.

3. The cantilever vertical screw vacuum pump according to claim 1, wherein the cantilever vertical screw vacuum pump further comprises a coolant spacer sleeve, a reflux cooling pipe, a reflux input pipe joint, and a reflux output pipe joint; the coolant spacer sleeve is disposed on the pump body, the reflux cooling pipe is disposed in the coolant spacer sleeve, two ends of the reflux cooling pipe are connected to the reflux input pipe joint and the reflux output pipe joint respectively, and a position of the reflux input pipe joint and a position of the reflux output pipe joint are at different heights.

4. The cantilever vertical screw vacuum pump according to claim 1, wherein the cantilever vertical screw vacuum pump further comprises a pump coupling; the pump coupling is disposed under the driving synchronous gear while the oil baffle is disposed below the driving synchronous gear, and an outer diameter of the oil baffle is provided with evenly distributed oil splashing holes.

5. The cantilever vertical screw vacuum pump according to claim 1, wherein each of the two inner shaft sleeves is provided with one or more labyrinth sealing grooves.

6. A cantilever vertical screw vacuum pump, comprising:
a lower cover, provided with a lower cover shaft sleeve, wherein an inner wall of the lower cover and an outer wall of the lower cover shaft sleeve together define an oil chamber;
a middle support, disposed on the lower cover;
a pump body, disposed on the middle support;
screw rods, disposed in the pump body and meshed together;
pump shafts, disposed in the screw rods respectively;
a motor, disposed under the lower cover, wherein an output shaft of the motor is disposed in the lower cover shaft sleeve and connected to one of the pump shafts;
inner shaft sleeves, disposed in the screw rods and sleeved outside the pump shafts respectively, wherein a lower part of each of the inner shaft sleeves is provided with oil inlet holes;
lubricating oil lifters, sleeved outside the pump shafts respectively, and wherein each of the lubricating oil lifters is disposed between the pump shaft and the inner shaft sleeve;
two sets of bearings, disposed in the inner shaft sleeves respectively, wherein each of the two sets of bearings is connected between the pump shaft and the inner shaft sleeve, each of the two sets of bearings comprises an upper bearing and a lower bearing, the upper bearing and the lower bearing are disposed on two ends of a respective oil lifter of the lubricating oil lifters;
bearing gland oil seal assemblies, disposed in the screw rods and on upper ends of the inner shaft sleeves respectively;
oil guide plates, disposed on the inner shaft sleeves respectively, wherein each of the oil guide plates is arranged corresponding to the oil inlet holes of a respective inner shaft sleeve of the inner shaft sleeves; and
an oil splashing sleeve, connected to another one of the pump shafts different from the pump shaft connected to the output shaft of the motor, and disposed in the oil chamber.

* * * * *